(12) United States Patent
Ohmura

(10) Patent No.: US 9,981,622 B2
(45) Date of Patent: May 29, 2018

(54) OCCUPANT PROTECTION CONTROL SYSTEM, STORAGE MEDIUM STORING PROGRAM, AND VEHICLE

(71) Applicant: TOYOTA JIDOSHA KABUSHIKI KAISHA, Toyota-shie, Aichi-ken (JP)

(72) Inventor: Yukito Ohmura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 14/982,848

(22) Filed: Dec. 29, 2015

(65) Prior Publication Data
US 2016/0272141 A1 Sep. 22, 2016

(30) Foreign Application Priority Data
Mar. 19, 2015 (JP) ................................. 2015-056604

(51) Int. Cl.
B60R 21/013 (2006.01)
B60R 21/015 (2006.01)
(Continued)

(52) U.S. Cl.
CPC .......... B60R 21/16 (2013.01); B60R 21/0134 (2013.01); B60R 21/0136 (2013.01); B60R 21/01554 (2014.10); G01C 21/34 (2013.01); B60R 2021/0002 (2013.01); B60R 2021/01034 (2013.01); B60R 2021/01286 (2013.01)

(58) Field of Classification Search
CPC .............. B60R 21/16; B60R 21/01554; B60R 21/0134; B60R 21/0136; B60R 2021/0002; B60R 2021/01034; B60R 2021/01286; G01C 21/34
See application file for complete search history.

(56) References Cited

U.S. PATENT DOCUMENTS

| 6,151,539 A | 11/2000 | Bergholz et al. |
| 2011/0125345 A1 | 5/2011 | Parienti |

(Continued)

FOREIGN PATENT DOCUMENTS

| DE | 102015103198 A1 | 9/2015 |
| JP | H10-129405 A | 5/1998 |

(Continued)

Primary Examiner — Jerrah Edwards
Assistant Examiner — Mathew Franklin Gordon
(74) Attorney, Agent, or Firm — Oliff PLC

(57) ABSTRACT

An occupant protection control system that includes: a crash sensing component that senses an occurrence of a crash of a vehicle, including a crash type; a detecting component that detects a current seat state, of a seat whose state can be changed from a normal state; plural types of occupant protection devices that are disposed according to crash type and protect, according to crash type, an occupant seated in the seat; and a control component that, on the basis of a detection result of the detecting component and a sensing result of the crash sensing component, controls the plural types of occupant protection devices in such a way that, among the plural types of occupant protection devices, the control component operates occupant protection devices that are necessary to protect the occupant and prohibits operation of occupant protection devices that are not necessary to protect the occupant.

12 Claims, 9 Drawing Sheets

(51) Int. Cl.
*B60R 21/16* (2006.01)
*G05D 1/02* (2006.01)
*B60R 21/0134* (2006.01)
*B60R 21/0136* (2006.01)
*G01C 21/34* (2006.01)
*B60R 21/00* (2006.01)
*B60R 21/01* (2006.01)

(56) References Cited

U.S. PATENT DOCUMENTS

| | | | |
|---|---|---|---|
| 2012/0089299 A1* | 4/2012 | Breed | B60C 11/24 |
| | | | 701/36 |
| 2014/0081505 A1* | 3/2014 | Klinger | G08G 1/162 |
| | | | 701/25 |
| 2014/0358378 A1* | 12/2014 | Howard | B60N 2/501 |
| | | | 701/45 |
| 2015/0258954 A1 | 9/2015 | Engelman et al. | |
| 2017/0021795 A1* | 1/2017 | Gallagher | B60N 2/24 |

FOREIGN PATENT DOCUMENTS

| | | |
|---|---|---|
| JP | H10-324221 A | 12/1998 |
| JP | H11-170961 A | 6/1999 |
| JP | H11-212640 A | 8/1999 |
| JP | 2002-019555 A | 1/2002 |
| JP | 2008-170404 A | 7/2008 |
| JP | 2009-073207 A | 4/2009 |
| JP | 2009-190515 A | 8/2009 |
| JP | 2011-528833 A | 11/2011 |

\* cited by examiner

FIG.4

| SEAT ARRANGEMENT | D SEAT AIRBAG | P SEAT AIRBAG | SIDE AIRBAGS | CURTAIN SHIELD AIRBAGS | PRETENSIONERS |
|---|---|---|---|---|---|
| NORMAL STATE | ON | ON | ON | ON | ON |
| SEATS ROTATED 180° (FACING REARWARD) | OFF | OFF | ON | ON | ON |
| SEATS ROTATED 90° (FACING EACH OTHER) | ON | ON | OFF | CONDITIONALLY ON | ON |
| SEATS ROTATED 90° (FACING OUTWARD) | ON | ON | OFF | ON | ON |
| ONE SEAT ROTATED 180° | OFF WHEN ROTATED 180° | OFF WHEN ROTATED 180° | ON | ON | ON |

OCCUPANT PROTECTION CONTROL SYSTEM, STORAGE MEDIUM STORING PROGRAM, AND VEHICLE

CROSS-REFERENCE TO RELATED APPLICATION

This application is based on and claims priority under 35 USC 119 from Japanese Patent Application No. 2015-056604 filed on Mar. 19, 2015, which is incorporated by reference herein.

BACKGROUND

Technical Field

The present invention relates to an occupant protection control system that controls plural types of occupant protection devices such as various types of airbag devices and pretensioners; an occupant protection control program; and a vehicle.

Related Art

Japanese Patent Application Laid-open (JP-A) No. H11-170961 discloses a vehicle airbag control system having rotating seats rotatably supported on a vehicle body, side airbags disposed in vehicle outside portions of the rotating seats, and a control unit that performs control so as to deploy the side airbags at the time of a side crash of the vehicle. Additionally, prohibiting the side airbags from deploying at the time of a side crash of the vehicle in a case where, in accordance with detection signals of seat sensors that detect the directions the rotating seats face, it has been confirmed that the rotating seats are facing the inside of the cabin has been proposed.

However, although the vehicle airbag control system in JP-A No. H11-170961 prohibits the deployment of the side airbags in a case where the rotating seats have been rotated, no consideration is given to other types of occupant protection devices. In a case where the vehicle is equipped with plural types of occupant protection devices, depending on the seat state there are occupant protection devices that operate properly and occupant protection devices that do not operate properly, so there is room for improvement.

An object of the present disclosure is to properly operate plural types of occupant protection devices according to the seat state.

SUMMARY OF THE INVENTION

A first aspect is an occupant protection control system including: a crash sensing component that senses the occurrence of a crash of a vehicle including crash type; a detecting component that detects a current seat state, including a predetermined normal state, of a seat whose state can be changed from the normal state; plural types of occupant protection devices that are disposed in correspondence to crash type and protect, in accordance with crash type, an occupant seated in the seat; and a control component which, on the basis of the detection result of the detecting component and the sensing result of the crash sensing component, controls the plural types of occupant protection devices in such a way that, among the plural types of occupant protection devices, the control component operates the occupant protection devices that are necessary to protect the occupant and prohibits the operation of the occupant protection devices that are not necessary to protect the occupant.

According to the first aspect, the crash sensing component senses the occurrence of a crash of the vehicle including crash type. The crash sensing component senses the occurrence of a crash of the vehicle including crash type on the basis of information acquired by various types of sensors and cameras, for example.

The detecting component detects the current seat state, including the predetermined normal state, of the seat whose state can be changed from the normal state. The detecting component detects the seat state such as the direction in which a rotatable seat faces and the seat position, for example.

The plural types of occupant protection devices are disposed in correspondence to crash type and protect, in accordance with crash type, the occupant the seated in the seat. As the plural types of occupant protection devices, for example, various types of airbags, such as a driver seat airbag, a front passenger seat airbag, side airbags, and curtain shield airbags, and pretensioners that take up seat belts can be applied.

Additionally, on the basis of the detection result of the detecting component and the sensing result of the crash sensing component, the control component controls the plural types of occupant protection devices in such a way that, among the plural types of occupant protection devices, the control component operates the occupant protection devices that are necessary to protect the occupant and prohibits the operation of the occupant protection devices that are not necessary to protect the occupant. Because of this, the control component can, depending on the seat state, prohibit the operation of the occupant protection devices that are not necessary to operate and can operate the occupant protection devices that are necessary to operate, so the plural types of occupant protection devices can be properly operated in accordance with the seat arrangement.

In a second aspect, whether or not operation of each of the plural types of occupant protection devices is necessary is predetermined according to the seat state, and in accordance with the seat state detected by the detecting component the control component controls the plural types of occupant protection devices in such a way that the control component prohibits the operation of the occupant protection devices that are not necessary to operate among the plural types of occupant protection devices and, in a case where the occurrence of a crash of the vehicle has been sensed by the crash sensing component, the control component operates the occupant protection devices according to crash type among the occupant protection devices that are not prohibited from operating.

In a third aspect, the occupant protection control system further includes a predicting component that predicts a crash of the vehicle and a changing component that changes the seat state, wherein when, in a case where a crash of the vehicle has been predicted by the predicting component and a seat state other than the normal state has been detected by the detecting component, the seat state can be changed to the normal state before the crash occurs, the control component further controls, without prohibiting the operation of the occupant protection devices, the changing component so as to change the seat state to the normal state.

In a fourth aspect, the occupant protection control system further includes a driving control component that generates, on the basis of peripheral information relating to the area around the vehicle and map information, a travel plan following a preset target route and controls driving in such a way that the vehicle autonomously travels in accordance with the generated travel plan. A fifth aspect is the fourth aspect, wherein the control by the control component is performed during the control of the driving control component. Because of this, in a case where the state of the seat including the driver seat is changed during automatic driving, the plural types of occupant protection devices can be properly operated in accordance with the seat arrangement.

A sixth aspect is an occupant protection control program for causing a processor to function as the control component of the occupant protection control system of any of the first to fifth aspects. The occupant protection control program may be stored in an outside server, read by the occupant protection control system, and executed by a processor, or may be stored in a non-transitory recording medium such as a DVD, read by the occupant protection control system, and executed by a processor.

A seventh aspect is a vehicle including: a driving control component that generates, on the basis of peripheral information relating to the area around the vehicle and map information, a travel plan following a preset target route and controls driving in such a way that the vehicle autonomously travels in accordance with the generated travel plan; and the occupant protection control system according to any of the first to third aspects.

BRIEF DESCRIPTION OF THE DRAWINGS

FIG. 4 is a table showing operational settings of the occupant protection devices according to seat arrangement;

DESCRIPTION OF EMBODIMENTS

Figure 1:
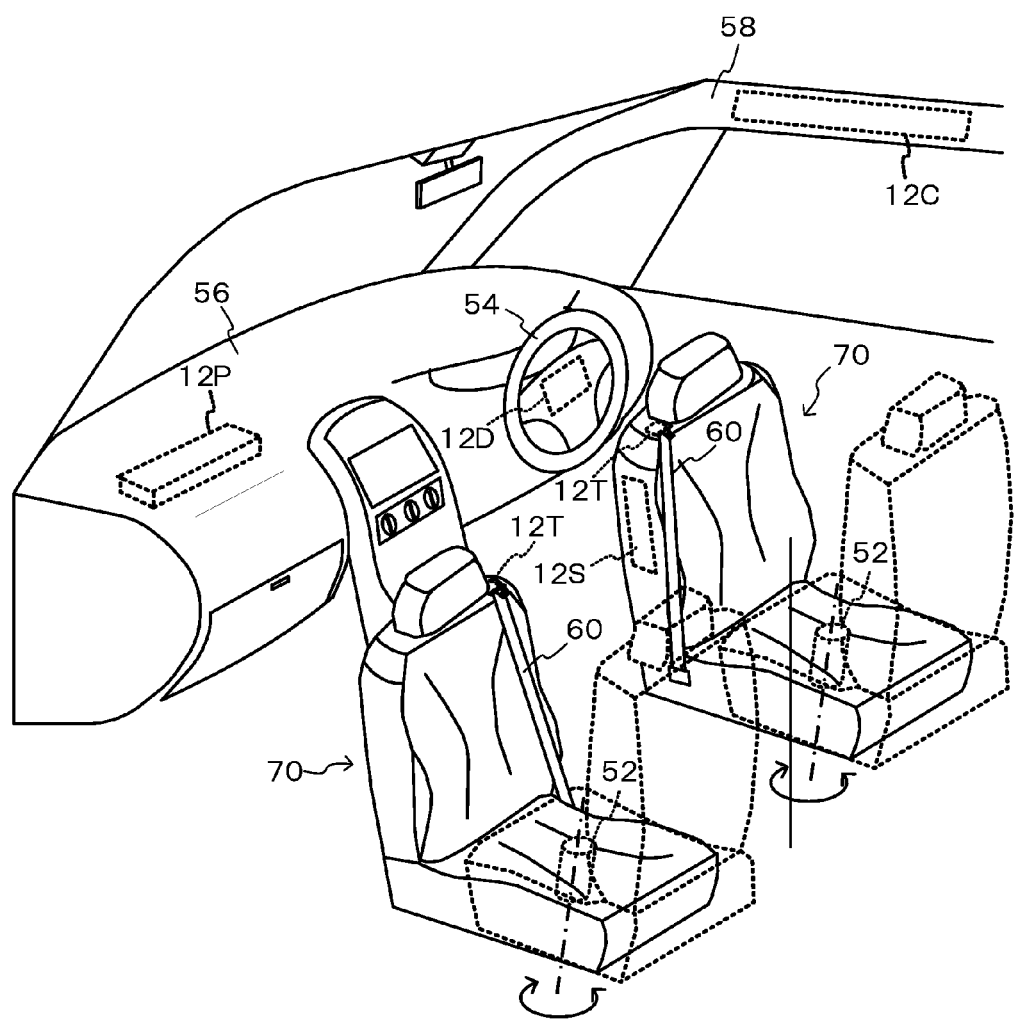
FIG. 1 is a drawing showing positions where plural types of occupant protection devices, which are control targets of occupant protection control systems pertaining to embodiments, are installed.

Examples of embodiments of the present invention will be described in detail below with reference to the drawings. FIG. 1 is a drawing showing positions where plural types of occupant protection devices 12, which are control targets of occupant protection control systems pertaining to the embodiments, are installed.

A vehicle in which the occupant protection control systems pertaining to the embodiments are installed is, as shown in FIG. 1, equipped with rotatable seats 70.

The seat states of the seats 70 can be changed from a predetermined normal state. Specifically, the seats 70 include a driver seat and a front passenger seat that are rotatable, and the seat states of the seats 70 can be changed from a normal state in which the seats 70 face forward. That is, each of the seats 70 is rotatable about a rotating shaft 52 so that plural types of seat arrangements are possible. As the seat arrangements, for example, the seats 70 can be arranged in such a way that they are rotated 90 degrees, 180 degrees, and so forth. Specific seat arrangements will be described later. It should be noted that, in FIG. 1, the seat arrangement indicated by the solid lines represents a case where the driver seat and the front passenger seat are rotated 180 degrees (so that they face rearward), and the seat arrangement indicated by the dashed lines represents the normal state in which the driver seat and the front passenger seat face forward.

Furthermore, in the vehicle, the plural types of occupant protection devices 12 that protect occupants seated in the seats 70 are disposed in correspondence to crash type. In the embodiments, as the plural types of occupant protection devices 12, the vehicle is equipped with a driver seat airbag (hereinafter called a D seat airbag) 12D, a front passenger seat airbag (hereinafter called a P seat airbag) 12P, side airbags 12S, curtain shield airbags 12C, and pretensioners 12T.

The D seat airbag 12D is disposed in a steering wheel 54 and protects the occupant in the driver seat as a result of a bag being deployed between the steering wheel 54 and the occupant by an inflator in the case of a frontal crash, for example.

The P seat airbag 12P is disposed in an instrument panel 56 and, like the D seat airbag 12D, protects the occupant in the front passenger seat as a result of a bag being deployed between the instrument panel 56 and the occupant by an inflator in the case of a frontal crash, for example.

The side airbags 12S are disposed in the vehicle outsides of the seats 70 in a case where the driver seat and the front passenger seat are in the normal state (positions in which the driver seat and the front passenger seat face forward). The side airbags 12S protect the occupants as a result of bags being deployed between the occupants and doors by inflators in the case of a side crash, for example.

The curtain shield airbags 12C are disposed in roof side rails 58 of the driver seat and the front passenger seat. The curtain shield airbags 12C protect the occupants as a result of bags being deployed between the occupants and side window glasses by inflators in the case of a side crash, for example.

The pretensioners 12T are disposed in seat backs of the seats 70 and, in the event of a crash, operate retractor devices that take up seat belts 60 to thereby eliminate slack in the seat belts 60. It should be noted that, in the present embodiment, because the seats 70 are rotatable, the retractor devices, seat belt anchors, and buckles are disposed in each of the seats 70.

First Embodiment

Figure 2:
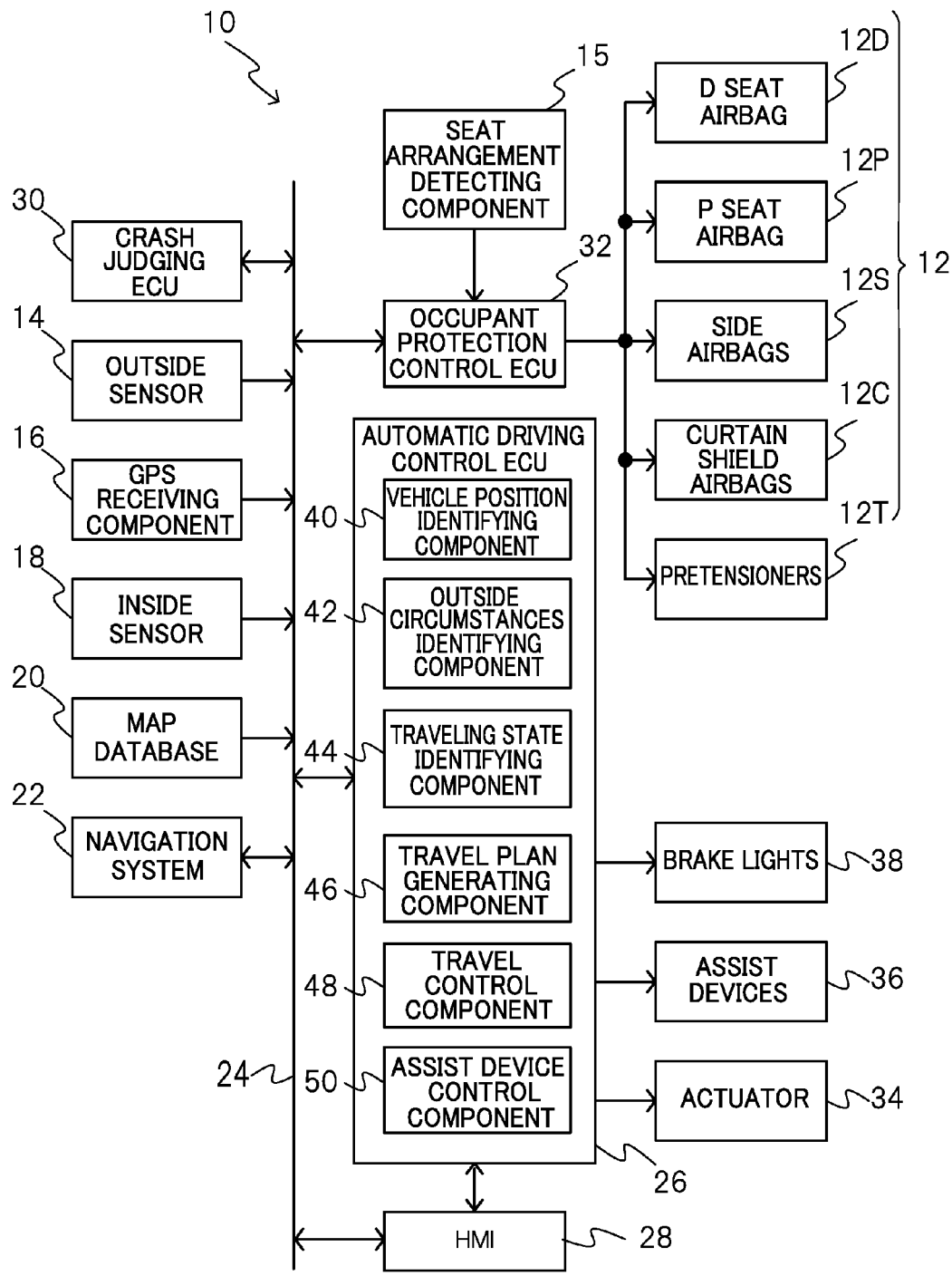
FIG. 2 is a block diagram showing the configuration of an occupant protection control system pertaining to a first embodiment.

The configuration of an occupant protection control system 10 pertaining to a first embodiment will now be described. FIG. 2 is a block diagram showing the configuration of the occupant protection control system 10 pertaining to the first embodiment.

The occupant protection control system 10 includes an outside sensor 14, a global positioning system (GPS) receiving component 16, an inside sensor 18, a map database 20, and a navigation system 22, and these are connected to an on-board network 24 such as a controller area network (CAN). An automatic driving control electronic control unit (ECU) 26 serving as a driving control component, a human machine interface (HMI) 28, a crash judging ECU 30 that is an example of a predicting component and a crash sensing component, and an occupant protection control ECU 32 that is an example of a control component are also connected to the on-board network 24.

The outside sensor 14 detects outside circumstances that are peripheral information relating to the area around the vehicle. The outside sensor 14 includes at least one of a camera, radar, and lidar (laser imaging detection and ranging). The camera is, for example, disposed on the cabin interior side of the upper portion of a front glass of the vehicle and acquires imaging information by capturing an image of the outside circumstances of the vehicle. The camera can transmit the acquired imaging information to the devices connected to the on-board network 24. The camera may be a monocular camera or a stereo camera. In the case of a stereo camera, the camera has two imaging components arranged so as to realize binocular parallax. The imaging information captured by the stereo camera also includes depth direction information. The radar transmits radio waves (e.g., millimeter waves) around the vehicle, receives radio waves reflected by barriers to thereby detect the barriers, and can transmit the detected barrier information to the devices connected to the on-board network 24. The lidar transmits light around the vehicle and receives light reflected by barriers to thereby measure the distance to the reflection points and detect the barriers. The lidar can transmit the detected barrier information to the devices connected to the on-board network 24. It should be noted that it is not invariably necessary for the vehicle to be redundantly equipped with the camera, radar, and lidar.

The GPS receiving component 16 measures the position of the vehicle (e.g., the latitude and longitude of the vehicle) by receiving signals from three or more GPS satellites. The GPS receiving component 16 can transmit the measured vehicle position information to the devices connected to the on-board network 24. It should be noted that another technology by which the latitude and longitude of the vehicle can be identified may also be used instead of the GPS receiving component 16. Furthermore, it is preferred that the GPS receiving component 16 have the function of measuring the bearing of the vehicle in order to check the measurement result of the sensor against later-described map information.

The inside sensor 18 detects vehicle circumstances such as traveling state by detecting various types of physical quantities when the vehicle is traveling. The inside sensor 18 includes at least one of a vehicle speed sensor, an acceleration sensor, and a yaw rate sensor, for example. The vehicle speed sensor is disposed on a wheel of the vehicle or a hub, rotor, or drive shaft that rotates integrally with the wheel, and the vehicle speed sensor detects the vehicle speed by detecting the rotational speed of the wheel. The vehicle speed sensor can transmit the detected vehicle speed information (wheel speed information) to the devices connected to the on-board network 24. The acceleration sensor detects acceleration produced by acceleration and deceleration, turns, or a crash of the vehicle. The acceleration sensor includes, for example, a longitudinal acceleration sensor that detects acceleration in the longitudinal direction of the vehicle and a lateral acceleration sensor that detects lateral acceleration of the vehicle. The acceleration sensor can transmit the acceleration information of the vehicle to the devices connected to the on-board network 24. The yaw rate sensor detects the yaw rate (angular velocity) about the vertical axis of the center of gravity of the vehicle. As the yaw rate sensor, for example, a gyro sensor can be used. The yaw rate sensor can transmit the detected yaw rate information to the devices connected to the on-board network 24.

The map database 20 is a database equipped with map information. The map database 20 is, for example, stored in a hard disk drive (HDD) installed in the vehicle. The map information includes, for example, road position information, road shape information (e.g., curves, types of linear sections, radius of curvature of curves, etc.), and intersection and junction position information. Moreover, the map information may also include the output signal of the outside sensor 14 in order to use position information of shielding structures, such as buildings and walls, and simultaneous location and mapping (SLAM) technology. It should be noted that the map database 20 may also be stored in a computer in a facility such as an information processing center that can communicate with the vehicle.

The navigation system 22 guides the driver of the vehicle to a destination set by the driver of the vehicle. The navigation system 22 calculates a route the vehicle is to travel on the basis of the vehicle position information measured by the GPS receiving component 16 and the map information in the map database 20. The route may also be one in which a suitable lane is identified in plural lane sections. The navigation system 22, for example, computes a target route leading from the position of the vehicle to the destination and informs the occupant of the target route by displaying the route on a display or outputting audio from a speaker. The navigation system 22 can transmit the information of the target route of the vehicle to the devices connected to the on-board network 24. It should be noted that the functions of the navigation system 22 may also be stored in a computer in a facility such as an information processing center that can communicate with the vehicle.

The automatic driving control ECU 26 is configured by a microcomputer including a central processing unit (CPU) that is an example of a processor, a read-only memory (ROM), and a random access memory (RAM). Furthermore, an actuator 34, assist devices 36, brake lights 38, and the HMI 28 are connected to the automatic driving control ECU 26.

The automatic driving control ECU 26 controls automatic driving by controlling the actions of the actuator 34, the assist devices 36, the brake lights 38, and the HMI 28 by deploying in the RAM and executing with the CPU a program stored beforehand in the ROM. It should be noted that the automatic driving control ECU 26 may also be configured by plural electronic control units.

The actuator 34 is a control target in a case where the automatic driving control ECU 26 performs automatic driving control of the vehicle, and the automatic driving control ECU 26 performs travel control of the vehicle by controlling the actions of the actuator 34. Specifically, the actuator 34 includes at least one of a throttle actuator, a brake actuator, and a steering actuator. The throttle actuator controls how much air is supplied to the engine (the throttle opening degree) in accordance with an instruction from the automatic driving control ECU 26 to control the drive force of the vehicle. It should be noted that in a case where the vehicle is a hybrid vehicle or an electric automobile, the vehicle does not include a throttle actuator, and the instruction from the automatic driving control ECU 26 is input to a motor serving as a power source so that the drive force is controlled. The brake actuator controls a brake system in accordance with an instruction from the automatic driving control ECU 26 to thereby control the braking force applied to the wheels of the vehicle and control the lighting-up of the brake lights 38. As the brake system, for example, a hydraulic brake system can be used. The steering actuator controls, in accordance with an instruction from the automatic driving control ECU 26, the driving of an assist motor that controls the steering torque of a motorized power steering system. Because of this, the steering actuator controls the steering torque of the vehicle. The assist devices 36 ordinarily are devices that can be operated by the driver of the vehicle. The assist devices 36 generically are devices not included in the actuator 34. The assist devices 36 here include, for example, turn signal lamps, front headlamps, and wipers.

Specifically, the automatic driving control ECU 26 is configured to include a vehicle position identifying component 40, an outside circumstances identifying component 42, a traveling state identifying component 44, a travel plan generating component 46, a travel control component 48, and an assist device control component 50. The automatic driving control ECU 26 uses each of the aforementioned components to generate, on the basis of the peripheral information relating to the area around the vehicle and the map information, a travel plan following a preset target route and controls driving in such a way that the vehicle autonomously travels in accordance with the generated travel plan.

The vehicle position identifying component 40 identifies the position of the vehicle on a map (hereinafter called "the vehicle position") on the basis of the vehicle position information received by the GPS receiving component 16 and the map information in the map database 20. It should be noted that the vehicle position identifying component 40 may also acquire the vehicle position used by the navigation system 22 from the navigation system 22 to identify the vehicle position. In a case where the vehicle position can be measured by sensors installed outside such as on roads, the vehicle position identifying component 40 may also acquire the vehicle position by communication from these sensors.

The outside circumstances identifying component 42 identifies outside circumstances of the vehicle on the basis of the detection result of the outside sensor 14 (e.g., the imaging information acquired by the camera, the barrier information acquired by the radar, the barrier information acquired by the lidar, etc.). The outside circumstances include, for example, circumstances such as the positions of the white lines of the traveling lane with respect to the vehicle, the position of the lane center, the road width, the road shape, and barriers around the vehicle. It should be noted that examples of the road shape include the radius of curvature of the traveling lane and changes in the grade of and undulations in the road surface effective for estimation by the outside sensor 14. Furthermore, examples of the circumstances of barriers around the vehicle include information distinguishing between fixed barriers and moving barriers, the positions of barriers with respect to the vehicle, the moving direction of barriers with respect to the vehicle, and the relative velocity of barriers with respect to the vehicle. Furthermore, supplementing the precision of the position and direction of the vehicle acquired by the GPS receiving component 16 or the like by checking the detection result of the outside sensor 14 against the map information is suitable.

The traveling state identifying component 44 identifies the traveling state of the vehicle on the basis of the detection result of the inside sensor 18 (e.g., the vehicle speed information acquired by the vehicle speed sensor, the acceleration information acquired by the acceleration sensor, the yaw rate information acquired by the yaw rate sensor, etc.). The traveling state of the vehicle includes, for example, the vehicle speed, acceleration, and yaw rate.

The travel plan generating component 46 generates a course for the vehicle on the basis, for example, of the target route computed by the navigation system 22, the vehicle position identified by the vehicle position identifying component 40, and the outside circumstances of the vehicle (including the vehicle position and bearing) identified by the outside circumstances identifying component 42. As the course that the travel plan generating component 46 generates, the travel plan generating component 46 generates a path that the vehicle is to follow on the target route. The travel plan generating component 46 generates the course in such a way the vehicle suitably travels on the target route in view of criteria such as safety, compliance with laws and ordinances, and travel efficiency. At this time, the travel plan generating component 46 generates, on the basis of circumstances of barriers around the vehicle, a course for the vehicle in such a way that the vehicle avoids contact with the barriers. It should be noted that the target route also includes a travel route automatically generated on the basis of the outside circumstances and the map information when a destination has not been expressly set by the driver, like the along-the-road travel in Japanese Patent No. 5,382,218 (WO2011/158347) and JP-A No. 2011-162132, for example. The travel plan generating component 46 generates a travel plan according to the generated course. That is, the travel plan generating component 46 generates a travel plan following a preset target route at least on the basis of the outside circumstances that are peripheral information relating to the area around the vehicle and the map information in the map database 20. The travel plan generating component 46 preferably outputs the travel plan it generates as a set including the two elements of target positions p in a coordinate system in which the course of the vehicle is fixed in the vehicle and a velocity v at each target point—that is, a set having plural configuration coordinates (p, v). Here, each of the target positions p has at least an x-coordinate and a y-coordinate position in the coordinate system fixed in the vehicle or equivalent information. It should be noted that the travel plan is not particularly limited provided that it records the behavior of the vehicle. For example, the travel plan may also use target times t instead of the velocities v, or may also have the target times t and the bearing of the vehicle at those points in time added to it. Furthermore, ordinarily it suffices for the travel plan to be data generally several seconds in the future from the current time, but several tens of seconds of data become necessary depending on circumstances such as right turns at intersections and the passing of cars, so it is preferred that the number of configuration coordinates in the travel plan be variable and that the distances between the configuration coordinates also be variable. Moreover, a curved line joining together the configuration coordinates may also be approximated with a spline function or the like, with the parameters of that curved line being used as the travel plan. As for the generation of the travel plan, an arbitrary publicly known method can be used provided that it can record the behavior of the vehicle. Furthermore, the travel plan may also be data representing changes in the vehicle speed of the vehicle, acceleration and deceleration, and steering torque when the vehicle travels the course following the target route. The travel plan may also include the velocity pattern of the vehicle, the acceleration and deceleration pattern, and the steering pattern. The travel plan generating component 46 here may also generate the travel plan in such a way that travel time (the amount of time required for the vehicle to reach its destination) is minimized. The velocity pattern is, for example, data including, with respect to target control positions set in predetermined intervals (e.g., 1 m) on the course, target vehicle velocities set in correlation to time according to each target control position. The acceleration and deceleration pattern is, for example, data including, with respect to target control positions set in predetermined intervals (e.g., 1 m) on the course, target accelerations and decelerations set in correlation to time according to each target control position. The steering pattern is, for example, data including, with respect to target control positions set in predetermined intervals (e.g., 1 m) on the course, target steering torques set in correlation to time according to each target control position.

The travel control component 48 automatically controls the traveling of the vehicle on the basis of the travel plan generated by the travel plan generating component 46. The travel control component 48 outputs to the actuator 34 a control signal according to the travel plan. Because of this, the travel control component 48 controls the driving of the vehicle in such a way that the vehicle autonomously travels following the travel plan. Furthermore, in order for the vehicle to autonomously travel, when controlling the traveling of the vehicle the travel control component 48 controls the traveling of the vehicle in accordance with the travel plan while monitoring the identification results of the vehicle position identifying component 40, the outside circumstances identifying component 42, and the traveling state identifying component 44.

The assist device control component 50 integrates signals output from the HMI 28 with the travel plan generated by the travel plan generating component 46 to control the assist devices 36.

Furthermore, the crash judging ECU 30 is configured by a microcomputer including a CPU that is an example of a processor, a ROM, and a RAM. The crash judging ECU 30 predicts a crash of the vehicle and senses a crash including crash type on the basis of the detection results of the outside sensor 14 and the inside sensor 18 by deploying in the RAM and executing with the CPU a program stored beforehand in the ROM. The crash judging ECU 30, for example, calculates the relative distance to a barrier and the relative velocity from the outside circumstances detected by the outside sensor 14 and, on the basis of the relative distance and relative velocity it has calculated and the traveling state of the vehicle detected by the inside sensor 18, predicts a crash. Regarding the prediction of a crash of the vehicle, various types of known technologies can be employed. Furthermore, the crash judging ECU 30, for example, judges whether or not a crash has occurred from the traveling state of the vehicle (e.g., acceleration, a change in the vehicle speed, etc.) detected by the inside sensor 18 and senses the occurrence of a crash of the vehicle including crash type, such as a side crash, a rear crash, or a frontal crash.

The occupant protection control ECU 32 is configured by a microcomputer including a CPU that is an example of a processor, a ROM, and a RAM. The occupant protection control ECU 32 controls the plural types of occupant protection devices 12 on the basis of the crash prediction and crash judgment of the crash judging ECU 30 by deploying in the RAM and executing with the CPU a program stored beforehand in the ROM.

The D seat airbag 12D, the P seat airbag 12P, the side airbags 12S, the curtain shield airbags 12C, and the pretensioners 12T are connected as the plural types of occupant protection devices 12 to the occupant protection control ECU 32. The occupant protection control ECU 32 controls the operation of these plural types of occupant protection devices 12. It should be noted that for the sake of simplification FIG. 2 shows one each of the side airbags 12S and the curtain shield airbags 12C, but as mentioned above the side airbags 12S and the curtain shield airbags 12C are disposed in correspondence to the driver seat and the front passenger seat.

In this connection, in the present embodiment, as mentioned above, the seats 70 are rotatable, and the seats 70 can be arranged in plural types of seat arrangements in which the state of the seats 70 is changed. Depending on the seat arrangement, it is conceivable that the plural types of occupant protection devices 12 will not operate properly.

Therefore, in the present embodiment, among the plural types of occupant protection devices 12 the occupant protection control ECU 32 prohibits the operation of the occupant protection devices 12 that have been predetermined in accordance with the seat arrangement serving as the seat state. Additionally, in a case where the occurrence of a crash of the vehicle has been sensed, the occupant protection control ECU 32 controls the plural types of occupant protection devices 12 in such a way that, among the occupant protection devices 12 that are not prohibited from operating, the occupant protection control ECU 32 operates the occupant protection devices 12 according to the crash type. That is, the occupant protection control ECU 32 selects, and controls the operation of, the occupant protection devices 12 that will operate properly in accordance with the seat arrangement.

In order to perform the above-described control, in the present embodiment, a seat arrangement detecting component 15, which is an example of a detecting component that detects the seat arrangement, is also connected to the occupant protection control ECU 32. Additionally, the occupant protection control ECU 32 performs operation control of the occupant protection devices 12 on the basis of the detection result of the seat arrangement detecting component 15 and the crash occurrence sensing result, including the crash type, of the crash judging ECU 30. At this time, the occupant protection control ECU 32 controls the plural types of occupant protection devices 12 in such a way that, among the plural types of occupant protection devices 12, the occupant protection control ECU 32 operates the occupant protection devices 12 that are necessary to protect the occupants and prohibits the operation of the occupant protection devices 12 that are not necessary to protect the occupants. It should be noted that, as the seat arrangement detecting component 15, sensors or switches disposed in the rotating shafts 52, for example, can be used, so that the rotational positions are detected by the sensors or switches.

Here, specific examples of seat arrangements will be described. FIG. 3A to FIG. 3E are drawings showing examples of seat arrangements.

Figure 3A:
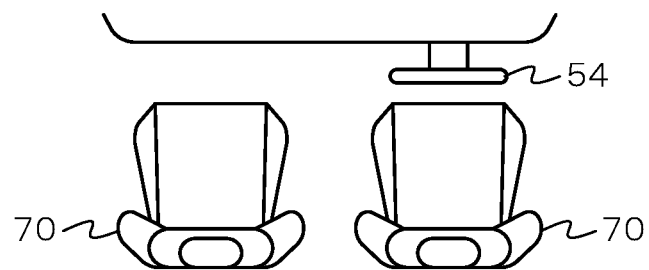
FIG. 3A is a drawing showing an example of a seat arrangement.
Figure 3B:
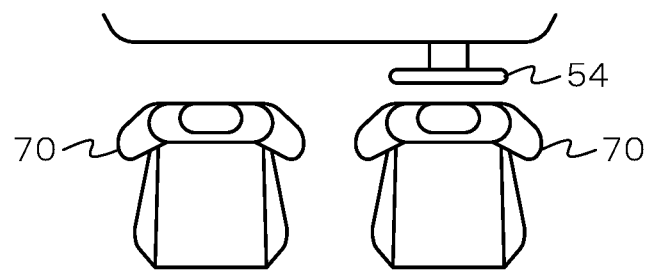
FIG. 3B is a drawing showing an example of a seat arrangement.
Figure 3C:
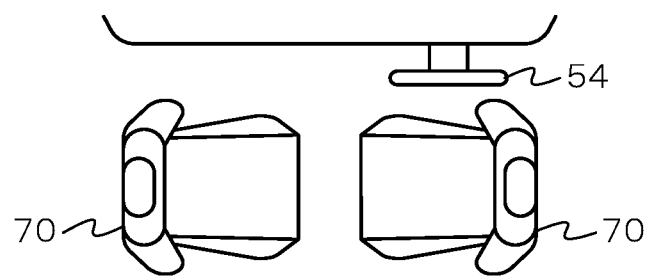
FIG. 3C is a drawing showing an example of a seat arrangement.
Figure 3D:
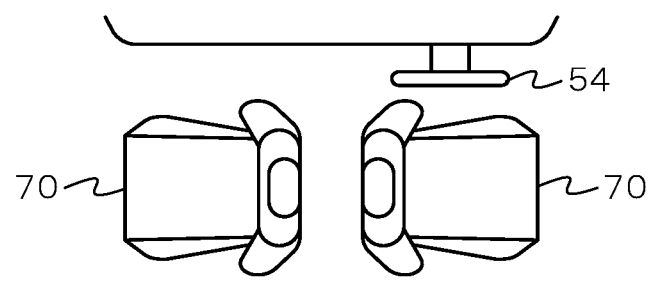
FIG. 3D is a drawing showing an example of a seat arrangement.
Figure 3E:
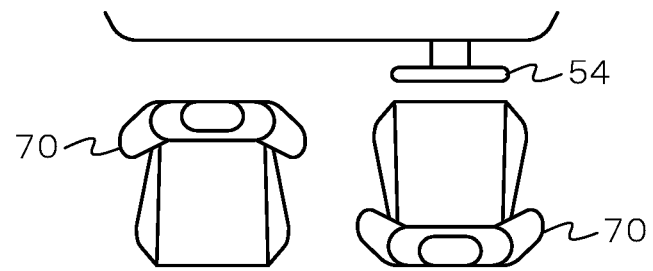
FIG. 3E is a drawing showing an example of a seat arrangement.

As mentioned above, in the present embodiment, the driver seat and the front passenger seat are rotatable, so they can be arranged in seat arrangements according to their rotational positions. For example, in the present embodiment, as shown in FIG. 3A to FIG. 3E, the seat arrangements include: the normal state; a seat arrangement in which the driver seat and the front passenger seat are rotated 180 degrees (so that they face rearward); a seat arrangement in which the driver seat and the front passenger seat are rotated 90 degrees (so that they face each other); a seat arrangement in which the driver seat and the front passenger seat are rotated 90 degrees (so that they face outward); and a seat arrangement in which one of the driver seat and the front passenger seat is rotated 180 degrees. FIG. 3A shows the normal state in which the driver seat and the front passenger seat face forward. FIG. 3B shows an example where the driver seat and the front passenger seat are rotated 180 degrees (so that they face rearward). FIG. 3C shows an example where the driver seat and the front passenger seat are rotated 90 degrees (so that they face each other). FIG. 3D shows an example where the driver seat and the front passenger seat are rotated 90 degrees (so that they face outward). FIG. 3E shows an example where one of the driver seat and the front passenger seat (in this case, the front passenger seat) is rotated 180 degrees. It should be noted that, in the present embodiment, because the vehicle can travel by being automatically driven, the driver seat rather than the front passenger seat may also be rotated 180 degrees.

Furthermore, in the present embodiment, whether or not operation of the occupant protection devices 12 is necessary is predetermined according to the seat arrangements (seat states) shown in FIG. 4. Specifically, as shown in FIG. 4, the types of the occupant protection devices 12 that operate according to each seat arrangement are determined and stored beforehand in the occupant protection control ECU 32. In the example in FIG. 4, in a case where the seat arrangement is the one in which the driver seat and the front passenger seat are in the normal state, all types of the occupant protection devices 12 are set to "on" (set to operate). In a case where the seat arrangement is the one in which the driver seat and the front passenger seat are rotated 180 degrees (so that they face rearward), the D seat airbag 12D and the P seat airbag 12P are set to "off" and the other occupant protection devices 12 are set to "on". In a case where the seat arrangement is the one in which the driver seat and the front passenger seat are rotated 90 degrees (so that they face each other), the side airbags 12S are set to "off" and the other occupant protection devices 12 are set to "on". However, regarding the curtain shield airbags 12C, as a conditional "on" setting, the curtain shield airbags 12C are set to "off" in a case where the reclining angle is a predetermined angle or more. In a case where the seat arrangement is the one in which the driver seat and the front passenger seat are rotated 90 degrees (so that they face outward), the side airbags 12S are set to "off" and the other occupant protection devices 12 are set to "on". Additionally, in a case where one of the driver seat and the front passenger seat is rotated 180 degrees, the airbag of the seat rotated 180 degrees (the driver seat or the front passenger seat) is set to "off" and the other occupant protection devices 12 are set to "on". In this way, whether or not operation of the occupant protection devices 12 is necessary is set according to each seat arrangement, and the occupant protection control ECU 32 controls the operation of each of the occupant protection devices 12 in accordance with the crash type and the seat arrangement, so it becomes possible to properly operate the occupant protection devices 12 in accordance with the seat arrangement.

Figure 5:
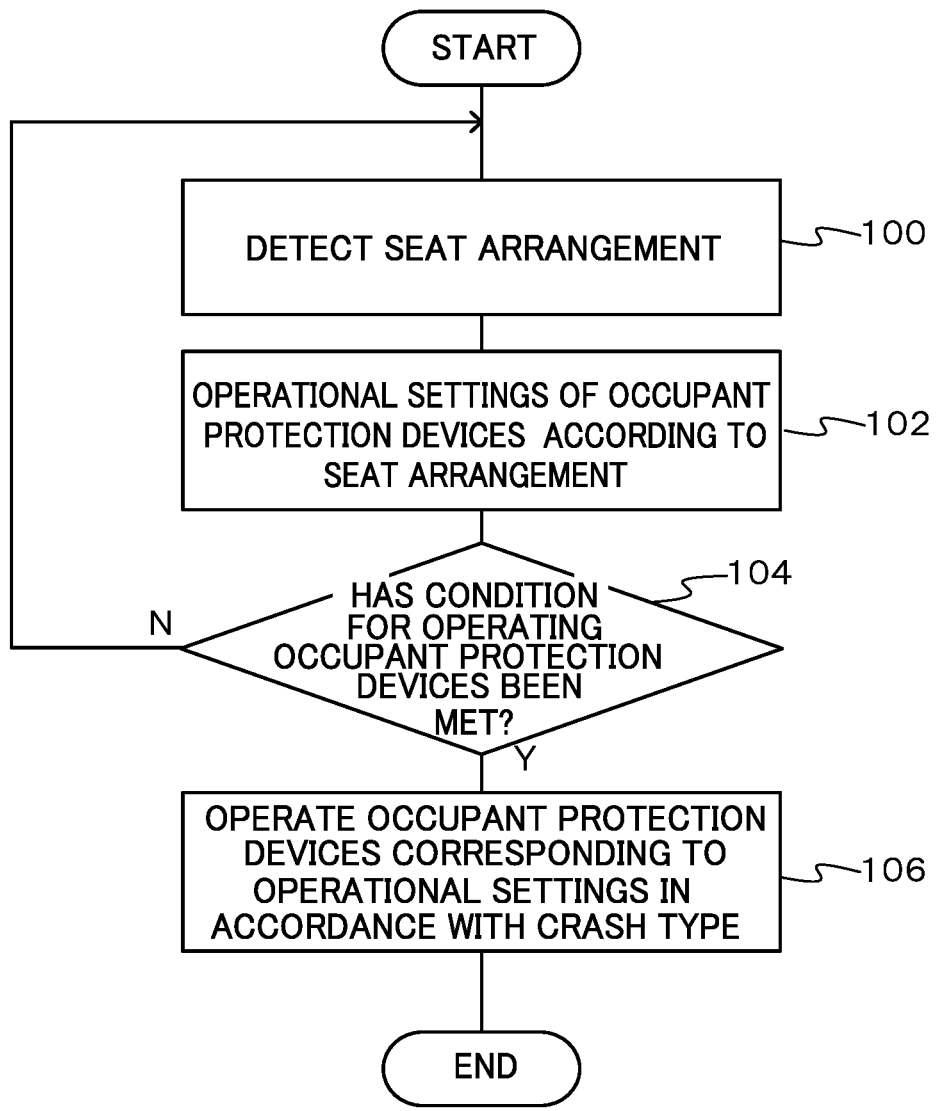
FIG. 5 is a flowchart showing an example of a flow of a process performed by an occupant protection control ECU of the occupant protection control system pertaining to the first embodiment.

Next, a specific process performed by the occupant protection control ECU 32 of the occupant protection control system 10 pertaining to the present embodiment configured as described above will be described. FIG. 5 is a flowchart showing an example of a flow of a process performed by the occupant protection control ECU 32 of the occupant protection control system 10 pertaining to the first embodiment. It should be noted that, although an example will be described where the occupant protection control ECU 32 starts the process of FIG. 5 in a case where the ignition switch has been switched "on", the process is not limited to this. For example, the occupant protection control ECU 32 may also start the process of FIG. 5 in a case where automatic driving has been started by the automatic driving control ECU 26, and in the case of manual driving the occupant protection control ECU 32 may also start the process of FIG. 5 in a case where a setting to execute vehicle behavior control has been made by the occupant operating a switch or the like.

In step 100 the occupant protection control ECU 32 detects the seat arrangement by acquiring the detection result of the seat arrangement detecting component 15, and then the occupant protection control ECU 32 moves to step 102.

In step 102 the occupant protection control ECU 32 performs operational settings for the occupant protection devices 12 according to the seat arrangement, and then the occupant protection control ECU 32 moves to step 104. That is, on the basis of the settings, according to seat arrangement and stored beforehand, as to whether or not operation of the occupant protection devices 12 is necessary, the occupant protection control ECU 32 reads the settings corresponding to the detected seat arrangement and sets each of the occupant protection devices 12 to "on" or "off".

In step 104 the occupant protection control ECU 32 determines whether or not a condition for operating the occupant protection devices 12 has been met. For example, the occupant protection control ECU 32 determines whether or not a condition for operating the occupant protection devices 12 has been met by determining whether or not the occurrence of a crash of the vehicle has been sensed by the crash judging ECU 30. In a case where the determination is "no" the occupant protection control ECU 32 returns to step 100 and repeats the above processes, and in a case where the determination is "yes" the occupant protection control ECU 32 moves to step 106.

In step 106 the occupant protection control ECU 32 performs control to operate, in accordance with the crash type, the occupant protection devices 12 corresponding to the operational settings, and then the occupant protection control ECU 32 ends the series of processes. For example, in a case where the crash type sensed by the crash judging ECU 30 is a frontal crash, the occupant protection control ECU 32 operates the pretensioners 12T. Moreover, in a case where the operational settings of the D seat airbag 12D and the P seat airbag 12P are set to "on", the occupant protection control ECU 32 operates the D seat airbag 12D and the P seat airbag 12P, and in a case where the operational settings of the D seat airbag 12D and the P seat airbag 12P are set to "off", the occupant protection control ECU 32 prohibits the operation of the D seat airbag 12D and the P seat airbag 12P. Furthermore, in a case where the crash type is a side crash, the occupant protection control ECU 32 operates the pretensioners 12T; in a case where the operational settings of the side airbags 12S and the curtain shield airbags 12C are set to "on", the occupant protection control ECU 32 operates the side airbags 12S and the curtain shield airbags 12C, and in a case where the operational settings of the side airbags 12S and the curtain shield airbags 12C are set to "off", the occupant protection control ECU 32 prohibits the operation of the side airbags 12S and the curtain shield airbags 12C.

In this way, the occupant protection control system 10 can properly operate the plural types of occupant protection devices 12 in accordance with the seat arrangement by controlling the operation of the plural types of occupant protection devices 12 in accordance with the seat arrangement.

Second Embodiment

Figure 6:
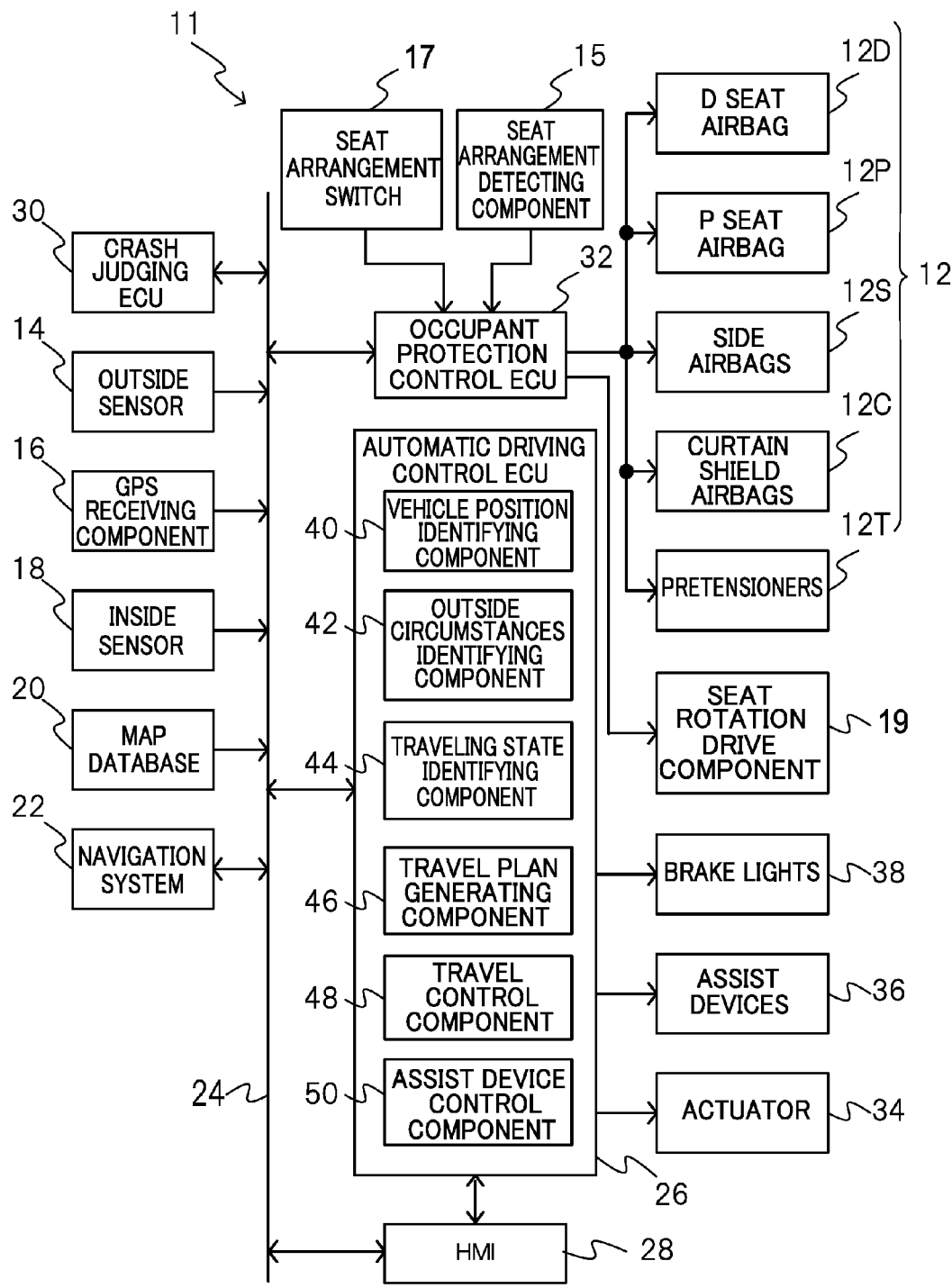
FIG. 6 is a block diagram showing the configuration of an occupant protection control system pertaining to a second embodiment.

Next, an occupant protection control system 11 pertaining to a second embodiment will be described. FIG. 6 is a block diagram showing the configuration of the occupant protection control system 11 pertaining to the second embodiment. It should be noted that, in regard to configurations that are the same as those in the first embodiment, the same reference signs are assigned thereto and description thereof is omitted.

In the first embodiment the seats 70 may be manually rotated or may be driven by a motor and various types of actuators, but in the occupant protection control system 11 pertaining to the second embodiment the seats 70 are rotated by a seat rotation drive component 19 that is an example of a changing component. Furthermore, as the seat rotation drive component 19, a motor and various types of actuators can be applied, and the seat rotation drive component 19 is instructed to operate by a seat arrangement switch 17.

That is, in the present embodiment, as shown in FIG. 6, the seat arrangement switch 17 and the seat rotation drive component 19 are connected to the occupant protection control ECU 32. Additionally, the occupant protection control ECU 32 controls the seat rotation drive component 19 in such a way that the seat arrangement changes to the seat arrangement instructed by the seat arrangement switch 17.

Furthermore, in the second embodiment, because the seats 70 can be rotated by the seat rotation drive component 19 to change the seat arrangement, in a case where a crash has been predicted, the occupant protection control ECU 32 determines whether or not the seat arrangement can be returned to the normal state before the crash occurs. Additionally, in a case where the seat arrangement can be returned to the normal state, the occupant protection control ECU 32 returns the seat arrangement to the normal state, and in a case where there is not enough time to return the seat arrangement to the normal state before the crash, like in the first embodiment the occupant protection control ECU 32 controls the operation of the occupant protection devices 12 in accordance with the settings, according to seat arrangement, as to whether or not operation of the occupant protection devices 12 is necessary. It should be noted that, in the case of returning the seat arrangement to the normal state, it is preferred that the seat arrangement be conditionally returned. Below, an example will be described where, in a case where a crash has been predicted, the occupant protection control ECU 32 returns the seat arrangement to the normal state only in the case of a seat arrangement in which the seats are rotated 90 degrees or less and does not return the seat arrangement to the normal state in the case of a seat arrangement in which the seats are rotated more than 90 degrees.

Figure 7:
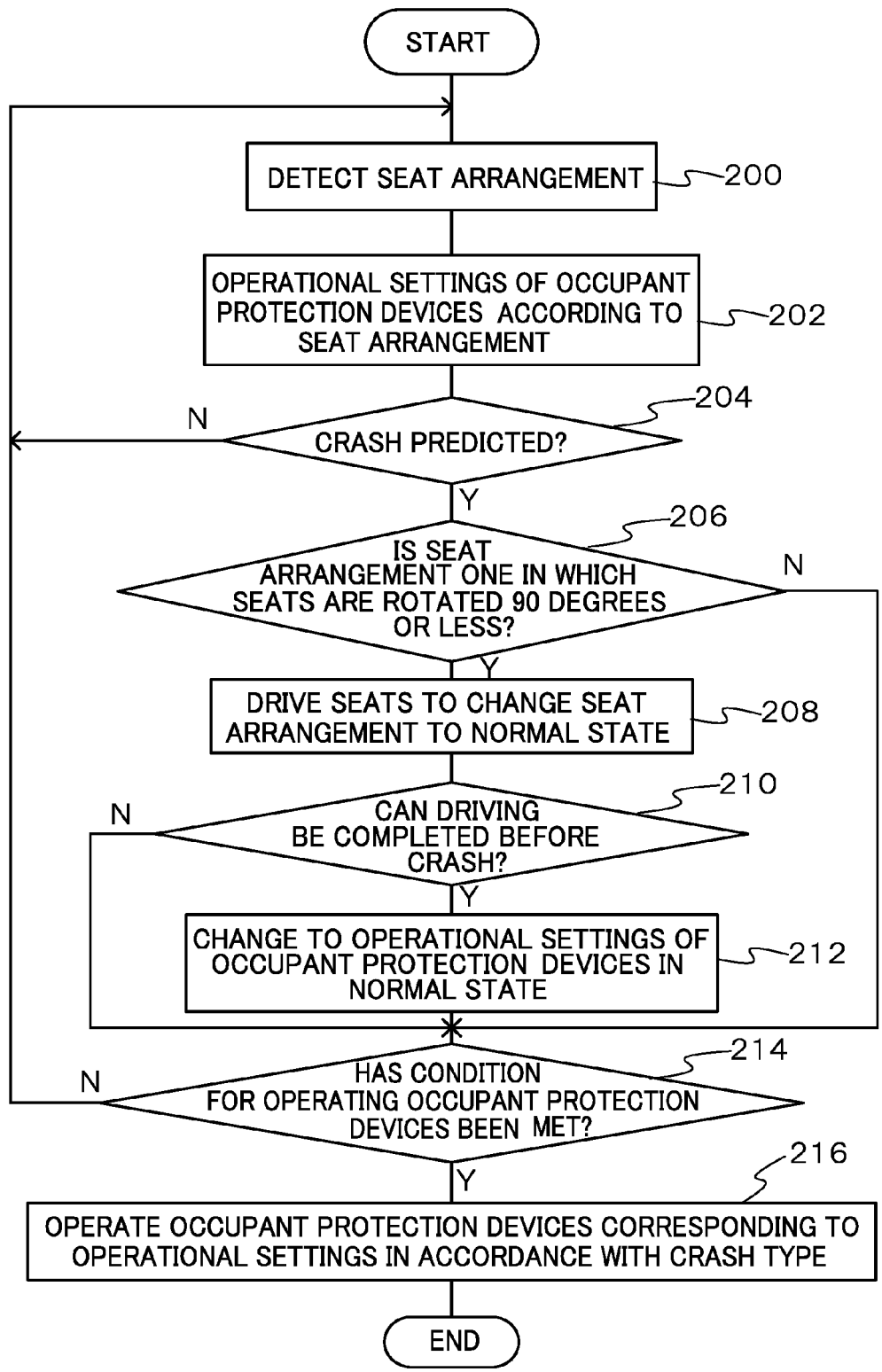
FIG. 7 is a flowchart showing an example of a flow of a process performed by an occupant protection control ECU of the occupant protection control system pertaining to the second embodiment.

Next, a specific process performed by the occupant protection control system 11 pertaining to the present embodiment will be described. FIG. 7 is a flowchart showing an example of a flow of a process performed by the occupant protection control ECU 32 of the occupant protection control system 11 pertaining to the second embodiment. It should be noted that, although an example will be described where the occupant protection control ECU 32 starts the process of FIG. 7 in a case where the ignition switch has been switched "on", the process is not limited to this. For example, the occupant protection control ECU 32 may also start the process of FIG. 7 in a case where automatic driving has been started by the automatic driving control ECU 26, and in the case of manual driving the occupant protection control ECU 32 may also start the process of FIG. 7 in a case where a setting to execute vehicle behavior control has been made by the occupant operating a switch or the like.

In step 200 the occupant protection control ECU 32 detects the seat arrangement by acquiring the detection result of the seat arrangement detecting component 15, and then the occupant protection control ECU 32 moves to step 202.

In step 202 the occupant protection control ECU 32 performs operational settings for the occupant protection devices 12 according to the seat arrangement, and then the occupant protection control ECU 32 moves to step 204. That is, on the basis of the settings, according to seat arrangement and stored beforehand, as to whether or not operation of the occupant protection devices 12 is necessary, the occupant protection control ECU 32 reads the settings corresponding to the detected seat arrangement and sets each of the occupant protection devices 12 to "on" or "off".

In step 204 the occupant protection control ECU 32 determines whether or not a crash has been predicted by the crash judging ECU 30. In a case where the determination is "no" the occupant protection control ECU 32 returns to step 200 and repeats the above processes, and in a case where the determination is "yes" the occupant protection control ECU 32 moves to step 206.

In step 206 the occupant protection control ECU 32 determines, in regard to each of the seats 70 and on the basis of the detection result of the seat arrangement detecting component 15, whether or not the seat arrangement is a seat arrangement in which the seats 70 are rotated 90 degrees or less. In a case where the determination is "yes" the occupant protection control ECU 32 moves to step 208, and in a case where the determination is "no" the occupant protection control ECU 32 moves to step 214.

In step 208 the occupant protection control ECU 32 controls the seat rotation drive component 19 to drive to the normal state the seats 70 that are rotated 90 degrees or less, and then the occupant protection control ECU 32 moves to step 210.

In step 210 the occupant protection control ECU 32 determines whether or not the rotational driving of the seats 70 to the normal state can be completed in the amount of time between the crash prediction made by the crash judging ECU 30 and the crash. In a case where the determination is "yes" the occupant protection control ECU 32 moves to step 212, and in a case where the determination is "no" the occupant protection control ECU 32 moves to step 214.

In step 212 the occupant protection control ECU 32 changes, in regard to the seats 70 that can be returned to the normal state before the crash, their operational settings to the settings in the normal state as to whether or not operation of the occupant protection devices 12 is necessary, and then the occupant protection control ECU 32 moves to step 214. It should be noted that although in the present embodiment the occupant protection control ECU 32 is configured in such a way that in step 108 it drives the seats 70 so that the seat arrangement returns to the normal state and then in step 210 it determines whether or not the rotational driving of the seats 70 can be completed before the crash, the process order may also be reversed. That is, the occupant protection control ECU 32 may also start driving the seats 70 to the normal state in a case where it has judged that the driving can be completed before the crash.

In step 214 the occupant protection control ECU 32 determines whether or not a condition for operating the occupant protection devices 12 has been met. For example, the occupant protection control ECU 32 determines whether or not a condition for operating the occupant protection devices 12 has been met by determining whether or not the occurrence of a crash of the vehicle has been sensed by the crash judging ECU 30. In a case where the determination is "no" the occupant protection control ECU 32 returns to step 200 and repeats the above processes, and in a case where the determination is "yes" the occupant protection control ECU 32 moves to step 216.

In step 216 the occupant protection control ECU 32 performs control to operate, in accordance with the crash type, the occupant protection devices 12 corresponding to the operational settings, and then the occupant protection control ECU 32 ends the series of processes. For example, in a case where the crash type sensed by the crash judging ECU 30 is a frontal crash the occupant protection control ECU 32 operates the pretensioners 12T. Moreover, in a case where the operational settings of the D seat airbag 12D and the P seat airbag 12P are set to "on", the occupant protection control ECU 32 operates the D seat airbag 12D and the P seat airbag 12P, and in a case where the operational settings of the D seat airbag 12D and the P seat airbag 12P are set to "off", the occupant protection control ECU 32 prohibits the operation of the D seat airbag 12D and the P seat airbag 12P. Furthermore, in a case where the crash type is a side crash, the occupant protection control ECU 32 operates the pretensioners 12T; in a case where the operational settings of the side airbags 12S and the curtain shield airbags 12C are set to "on", the occupant protection control ECU 32 operates the side airbags 12S and the curtain shield airbags 12C, and in a case where the operational settings of the side airbags 12S and the curtain shield airbags 12C are set to "off", the occupant protection control ECU 32 prohibits the operation of the side airbags 12S and the curtain shield airbags 12C.

In this way also, like in the first embodiment, the plural types of occupant protection devices 12 can be properly operated in accordance with the seat arrangement. Furthermore, in the present embodiment, in a case where the seat arrangement can be returned to the normal state before a crash, the occupant protection control ECU 32 changes the occupant protection devices 12 to their operational settings, so it becomes possible to operate the occupant protection devices 12 to the extent possible.

Figure 8A:
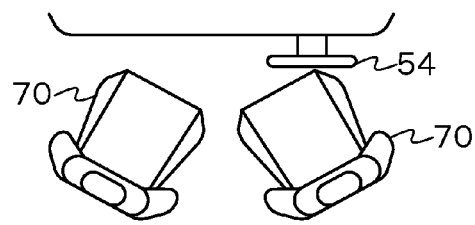
FIG. 8A is a drawing showing an example of a seat arrangement.
Figure 8B:
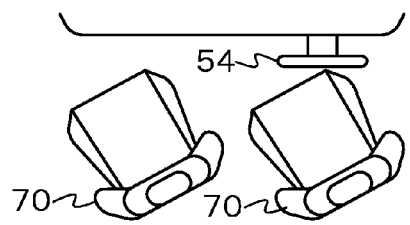
FIG. 8B is a drawing showing an example of a seat arrangement.
Figure 8C:
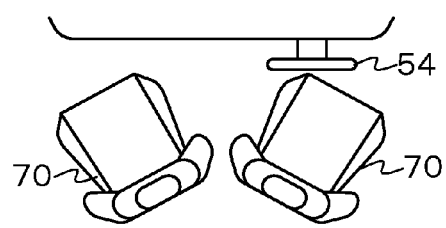
FIG. 8C is a drawing showing an example of a seat arrangement.
Figure 8D:
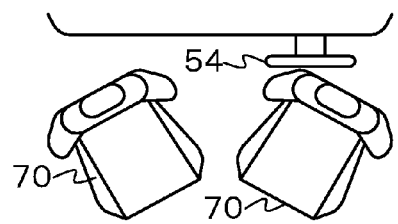
FIG. 8D is a drawing showing an example of a seat arrangement.
Figure 8E:
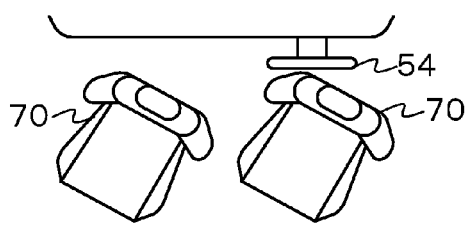
FIG. 8E is a drawing showing an example of a seat arrangement.
Figure 8F:
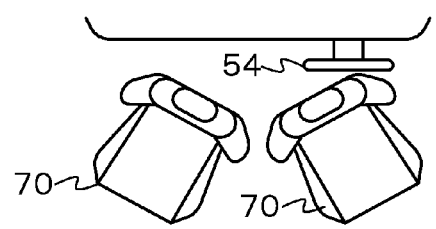
FIG. 8F is a drawing showing an example of a seat arrangement.

It should be noted that the seat arrangements in each of the above embodiments are not limited to the seat arrangements shown in FIG. 3A to FIG. 3E. For example, as shown in FIG. 8A to FIG. 8F, each of the seats 70 may also be configured to be rotatable to angles other than 90 degrees or 180 degrees. It should be noted that FIG. 8A shows an example where the driver seat and the front passenger seat are rotated less than 90 degrees in the direction of the vehicle center (so that they face forward). FIG. 8B shows an example where the driver seat and the front passenger seat are rotated less than 90 degrees to one side of the vehicle (so that they face forward). FIG. 8C shows an example where the driver seat and the front passenger seat are rotated less than 90 degrees in the directions of the outsides of the vehicle (so that they face forward). FIG. 8D shows an example where the driver seat and the front passenger seat are rotated less than 180 degrees in the direction of the vehicle center (so that they face rearward). FIG. 8E shows an example where the driver seat and the front passenger seat are rotated less than 180 degrees to one side of the vehicle (so that they face rearward). FIG. 8F shows an example where the driver seat and the front passenger seat are rotated less than 180 degrees in the directions of the outsides of the vehicle (so that they face rearward).

Furthermore, in each of the above embodiments, examples of seat arrangements in which the driver seat and the front passenger seat are rotated have been described as seat arrangements, but the seat arrangements are not limited to this. For example, the seat arrangements can also include seat arrangements in which the seat state is changed by changing the angles of the seat backs and seat arrangements in which the seat state is changed by changing the positions of the seats 70. Furthermore, the seat arrangements are not limited to just seat arrangements involving the driver seat and the front passenger seat, and on the basis of seat arrangements involving rear seats, the occupant protection control ECU 32 may also control the occupant protection devices 12 like the driver seat and the front passenger seat.

Furthermore, in the above embodiments, an example has been described where the automatic driving control ECU 26, the crash judging ECU 30, and the occupant protection control ECU 32 are each configured by a microcomputer, but the occupant protection control system is not limited to this. The functions of each ECU may also be realized by one microcomputer, or another ECU may also include any of their functions.

Furthermore, the process performed by the occupant protection control ECU 32 in the above embodiments has been described as a software process performed by executing a program, but the process may also be a process performed by hardware. Alternatively, the process may also be a process combining software and hardware. Furthermore, the program stored in the ROM may also be stored in various types of non-transitory storage media and distributed.

Moreover, the present invention is not limited to what is described above and can be modified and implemented in a variety of ways other than those described above without departing from the spirit thereof.

As described above, according to the present disclosure, plural types of occupant protection devices can be properly operated according to the seat state.

The invention claimed is:
1. An occupant protection control system comprising:
   a crash sensing component that senses a crash of a vehicle, including a crash type;
   a detecting component that detects a current seat state of a seat whose state can be changed from a predetermined normal state in which the seat faces forward to another state in which the seat does not face forward;
   plural types of occupant protection devices that are disposed according to crash type and that protect, according to crash type, an occupant seated in the seat;
   a predicting component that predicts a crash of the vehicle;
   a changing component that changes the seat state; and
   a control component that:

based on a detection result of the detecting component and a sensing result of the crash sensing component, operates at least one first device of the occupant protection devices that is necessary to protect the occupant and prohibits operation of at least one second device of the occupant protection devices that is not necessary to protect the occupant, and in a case where the crash of the vehicle has been predicted by the predicting component and the current seat state is detected to be the other state, and in a case where an angle difference between the detected current seat state and the normal state is a predetermined angle or less and it is possible to complete the change from the detected current seat state to the normal seat state before the predicted crash of the vehicle occurs, further controls the changing component to rotate the seat to change the seat state to the normal state without prohibiting the operation of the at least one second device of the occupant protection devices.

2. The occupant protection control system according to claim 1, wherein:

whether or not operation of each of the plural types of occupant protection devices is necessary is predetermined according to the seat state, and in accordance with the current seat state detected by the detecting component, the control component prohibits the operation of the at least one second device of the occupant protection devices that is not necessary to operate, and in a case where the crash has been sensed, the control component operates, according to crash type, the at least one first device of the occupant protection devices that are is not prohibited from operating.

3. The occupant protection control system according to claim 1, further comprising a driving control component that (i) generates, based on peripheral information relating to an area around the vehicle and map information, a travel plan following a preset target route and (ii) controls the vehicle to autonomously travel in accordance with the generated travel plan.

4. The occupant protection control system according to claim 3, wherein the control by the control component is performed during the control of the driving control component.

5. A non-transitory computer-readable storage medium storing a program executable by a processor to cause the processor to perform an occupant protection control process, the process comprising:

sensing a crash of a vehicle, including a crash type;

detecting a current seat state of a seat whose state can be changed from a predetermined normal state in which the seat faces forward to another state in which the seat does not face forward;

predicting a crash of the vehicle;

based on a result of sensing the crash of the vehicle and a result of detecting the current seat state, operating at least one first device of plural types of occupant protection devices that is necessary to protect an occupant seated in the seat and prohibiting operation of at least one second device of the occupant protection devices that is not necessary to protect the occupant seated in the seat, the plural types of occupant protection devices being disposed according to crash type and protecting, according to crash type, the occupant seated in the seat; and in a case where the crash of the vehicle has been predicted and the current seat state is detected to be the other state, and in a case where an angle difference between the detected current seat state and the normal state is a predetermined angle or less and it is possible to complete the change from the detected current seat state to the normal seat state before the predicted crash of the vehicle occurs, changing the seat state to the normal state by rotating the seat without prohibiting the operation of the at least one second device of the occupant protection devices.

6. The non-transitory storage medium according to claim 5, wherein:

whether or not operation of each of the plural types of occupant protection devices is necessary is predetermined according to the seat state, and in accordance with the current seat state that has been detected, the occupant protection control process prohibits the operation of the at least one second device of the occupant protection devices that is not necessary to operate, and in a case where the crash has been sensed, the occupant protection control process operates, according to crash type, the at least one first device of the occupant protection devices that is not prohibited from operating.

7. The non-transitory storage medium according to claim 5, wherein the occupant protection control process:

generates, based on map information and peripheral information relating to an area around the vehicle, a travel plan following a preset target route, and controls the vehicle to autonomously travel in accordance with the generated travel plan.

8. An occupant protection control method, comprising, via a processor:

sensing a crash of a vehicle including crash type;

detecting a current seat state of a seat whose state can be changed from a predetermined normal state in which the seat faces forward to another state in which the seat does not face forward;

predicting a crash of the vehicle;

based on a result of sensing the crash of the vehicle and a result of detecting the current seat state, operating at least one first device of plural types of occupant protection devices that is necessary to protect an occupant seated in the seat and prohibiting operation of at least one second device of the occupant protection devices that is not necessary to protect the occupant seated in the seat, the plural types of occupant protection devices being disposed according to crash type and protecting, according to crash type, the occupant seated in the seat; and in a case where the crash of the vehicle has been predicted and the current seat state is detected to be the other state, and in a case where an angle difference between the detected current seat state and the normal state is a predetermined angle or less and it is possible to complete the change from the detected current seat state to the normal seat state before the predicted crash of the vehicle occurs, changing the seat state to the normal state by rotating the seat without prohibiting the operation of the at least one second device of the occupant protection devices.

9. The occupant protection control method according to claim 8, wherein:

whether or not operation of each of the plural types of occupant protection devices is necessary is predetermined according to the seat state, and in accordance with the current seat state that has been detected, the processor prohibits the operation of the at least one second device of the occupant protection devices that is not necessary to operate, and in a case where the crash has been sensed, the processor operates, according to crash type, the at least one first device of the occupant protection devices that is not prohibited from operating.

10. The occupant protection control method according to claim 8, wherein the processor:
   generates, based on map information and peripheral information relating to an area around the vehicle, a travel plan following a preset target route, and
   controls the vehicle to autonomously travel in accordance with the generated travel plan.

11. A vehicle comprising:
   a driving control component that (i) generates, based on map information and peripheral information relating to an area around the vehicle, a travel plan following a preset target route and (ii) controls the vehicle to autonomously travel in accordance with the generated travel plan; and
   the occupant protection control system according to claim 1.

12. The occupant protection control system according to claim 1, wherein the detecting component comprises at least one switch configured to detect the angle of the seat at the current seat state.

* * * * *